United States Patent [19]

Eddy

[11] Patent Number: 4,903,906
[45] Date of Patent: * Feb. 27, 1990

[54] ENDLESS LOOP TRANSPORT AND STORAGE SYSTEM

[75] Inventor: Richard P. Eddy, Gardena, Calif.

[73] Assignee: Christie Electric Corp., Torrance, Calif.

[*] Notice: The portion of the term of this patent subsequent to Jun. 6, 2006 has been disclaimed.

[21] Appl. No.: 380,726

[22] Filed: Jul. 13, 1989

Related U.S. Application Data

[63] Continuation of Ser. No. 120,031, Nov. 13, 1987, abandoned.

[51] Int. Cl.⁴ .............................................. B65H 20/26
[52] U.S. Cl. ............................ 242/55.19 R; 352/128
[58] Field of Search ................... 242/55.18, 55.19 R, 242/55.19 A, 55.17; 352/128

[56] References Cited

U.S. PATENT DOCUMENTS

| | | | |
|---|---|---|---|
| 1,469,483 | 10/1923 | Parkinson | 242/55.19 R |
| 2,037,601 | 4/1936 | Shirlow et al. | 242/55.21 |
| 2,398,639 | 4/1946 | Heyer | 242/55.19 R |
| 3,352,506 | 11/1967 | Bodrov et al. | 242/55.18 |
| 3,484,051 | 12/1969 | Feinberg | 242/55.19 R |
| 3,863,852 | 2/1975 | Rackett et al. | 242/55.19 R |
| 4,010,910 | 3/1977 | Boudouris et al. | 242/55.18 |
| 4,066,221 | 1/1978 | Johnson | 242/55.19 A |
| 4,186,891 | 2/1980 | Johnson | 242/55.19 R |
| 4,208,018 | 6/1980 | Wilkinson | 242/55.19 R |
| 4,448,362 | 5/1984 | Johnson | 242/55.19 R |
| 4,504,025 | 3/1985 | Potts | 242/55.19 R |
| 4,708,447 | 11/1987 | Kuoni | 242/55.19 R X |

Primary Examiner—Joseph J. Hail, III
Attorney, Agent, or Firm—Harris, Kern, Wallen & Tinsley

[57] ABSTRACT

An apparatus for continuously storing a strip of material in a coil, including a flat platter and a drive for rotating the platter, the coil lying edgewise on the platter and the strip including an incoming strip portion leading to the coil periphery and an outgoing strip portion leading from the coil center, an arrangement for applying the incoming strip portion to the periphery of the coil of the strip on the platter as it rotates, in an even number of substantially straight strip sections joined at curved corners providing alternating even and odd strip sections and applying an inward pressure to the even strip sections to form the even strip sections into concave strip sections. A resistance pad positioned on the platter at the odd strip sections for engaging the strip edge and resisting movement of the strip toward the coil center, with the resistance pad having a friction producing surface with a lower level and a higher level with an inclined surface between the levels and with the outer edge of the higher level being substantially straight, and a skid pad positioned on the platter at the even strip sections for engaging the strip edge and enhancing movement of the strip toward the coil center, with the skid pad having a convex inner edge with an upward turned lip.

32 Claims, 7 Drawing Sheets

FIG. 3A
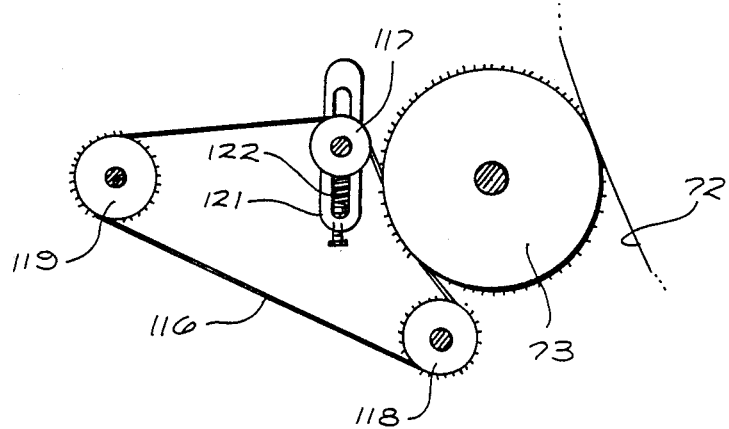
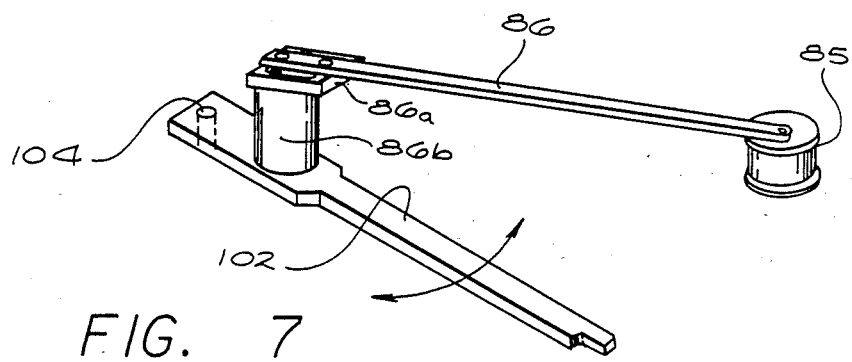
FIG. 7
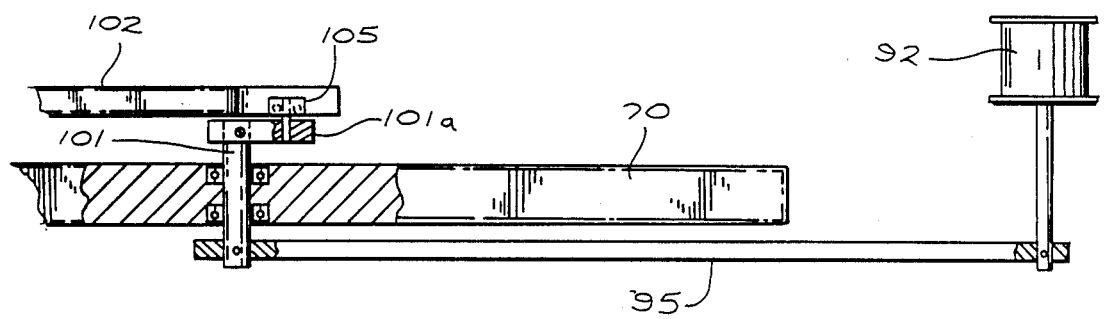
FIG. 8

ENDLESS LOOP TRANSPORT AND STORAGE SYSTEM

This application is a continuation of Ser. No. 120,031, filed on Nov. 13, 1987, now abandoned.

BACKGROUND OF THE INVENTION

This invention relates generally to a system for storing a quantity of continuous strip material such as tape or film. More particularly, the invention describes a method and apparatus for continuously storing motion picture film on edge on a flat rotating platter, as part of an endless loop film projection system.

It has long been recognized in motion picture projection that an endless loop system is desirable, in order to eliminate the need for manual rewinding and rethreading of film in repeated renditions of a program. A number of attempts have been made to provide for storing the film in a coil on a rotating turntable or platter in such a way as to minimize relative longitudinal movement between adjacent film layers in the coil, and yet permit, during each platter revolution, a predetermined length of film to be withdrawn from the center of the coil while the identical length of film is being added to the outside of the coil. The prior systems produce a series of singularly spaced, inwardly directed rounded cusps in the film coil, and are exemplified by the two U.S. Pat. Nos. 4,055,221 and 4,186,891 to Johnson, the U.S. Pat. No. 4,208,018 to Wilkerson, and the U.S. Pat. No. 4,504,025 to Potts. These patents in common with other prior systems include an application apparatus for incoming film which feeds or applies the incoming film to the rotating platter and means for shaping the film in the coil into a number of spaced inwardly directed cusps.

In another apparatus, the strip or film is transported from the edge of the platter toward the center of the coil by the tension of the strip in the outer layers. A cam is carried for rotation with the platter, with the cam having alternating arcuate sections and chord sections. The strip is applied to the outer periphery of the coil by a mechanism which includes a cam follower riding on the cam track as the platter rotates. This apparatus provides the desired cusps in the coil of film, but also involves an undesired tensioning of the film with a resultant rubbing of one layer of film against the adjacent layer.

A variation of the apparatus referred to in the preceding paragraph is shown in the copending application of Eddy U.S. Ser. No. 06/936,399, now Pat. No. 4,844,367 wherein a fixed roller is positioned at the arcuate outer periphery for urging the coil inward as the roller contacts the arcuate periphery of the coil.

Another apparatus is shown in the copending application of Eddy U.S. Ser. No. 07/068,325, now U.S. Pat. No. 4,836,463. In the apparatus of this copending application, the relationship of the application roller and the pusher roller is modified from that used in earlier units while the coil configuration is maintained essentially the same. The pusher roller is carried on the application arm so that it moves in and out with the in and out movement of the cam follower. In one embodiment, a four bar link is utilized to adjust movement of the pusher arm with reference to the application arm. Also, a servo arrangement provides a feedback type of operation for monitoring the amount of film being taken up on the platter as the platter rotates for automatically controlling the amount of film being wound onto the platter per revolution.

The two Eddy applications discussed above are assigned to the same assignee as is the present application.

Motion picture film has a tendency to curl in a transverse direction when a length of the film is in an unwound strip condition, as is the case when film is moving from the projector to the coil on the platter. Curling is a problem caused by the change in dimension of the emulsion side of the film with respect to the base side of the film and is exaggerated by changes in environmental conditions such as temperature and humidity.

While the apparatus referred to in the preceding paragraphs work satisfactorily in many installations, there are some situations, particularly high humidity environments, wherein problems in operation have been encountered. As a result, further improvements and changes in design and operation have been developed and are the subject of the present application.

SUMMARY OF THE INVENTION

It has been found that the curling problem can be overcome by applying the strip in a series of straight or substantially straight sections rather than in alternating straight and arcuate sections. Accordingly, it is an object of the present invention to provide a new and improved method and apparatus for continuously storing a strip of material in a coil and incorporating the advantages of the prior cam and cam follower systems, while overcoming the disadvantages thereof. A particular object of the invention is to provide such a method and apparatus which can utilize the cam and cam follower arrangement, the application arm carrying the cam follower and the pusher roller carried on the application arm, with or without the four bar mechanism and with or without the servo mechanism. Another object is to provide such a method and apparatus which can be used with motion picture film and with other strip material.

These and other objects, advantages, features and results will more fully appear in the course of the following description.

The invention includes means for applying the incoming strip portions to the periphery of the coil of the strip on the platter as the platter rotates, in an even number of substantially straight strip sections which are joined at curved corners providing alternating even and odd strip sections, and means for applying an inward pressure to the even strip sections to form the even strip sections into concave strip sections, preferably while maintaining the odd strip sections under tension and thereby straight. The invention also includes improved drag means in the form of resistant pads for the odd strip sections and improved skid means incorporating cusp forming edges in the even sections for aid in forming the alternating straight and concave strip sections of the coil. The invention further includes method and apparatus for handling film with sprocket holes using a sprocket drive rotating with the platter for applying the same number of strip sprocket holes to the coil on the platter for each revolution of the platter.

In the present invention, the cam has an even number of track sections joined at curved corners to provide alternating even and odd substantially straight track sections. While the cam track sections preferably are straight, it is not mandatory that they be straight, and the track sections may be slightly concave or slightly convex or a mix of concave and convex, concave and straight or straight and convex, with the motion of the application arm and pusher roller providing the desired alternating straight and concave strip sections of the formed coil.

In the preferred embodiment of the invention, the friction or drag pad at the odd strip sections is a two-level structure with the outer edge of the upper level being straight to help shape the straight portion of the coil of film. Also, the skid at the even sections has an upturned inner edge of a convex configuration so that the even portion of the strip is gathered at the upturned edge and released onto the platter in the desired concave configuration.

BRIEF DESCRIPTION OF THE DRAWINGS

FIG. 3A is a partial view taken along the line 3A—3A of FIG. 4, showing the drive for the sprocket 89 of FIG. 3;

FIG. 7 is a perspective view showing a portion of the structure for the roller support arm 86 of FIG. 3;

FIG. 8 is an enlarged partial sectional view taken along the line 8—8 of FIG. 3;

DESCRIPTION OF THE PREFERRED EMBODIMENTS

Figure 1:
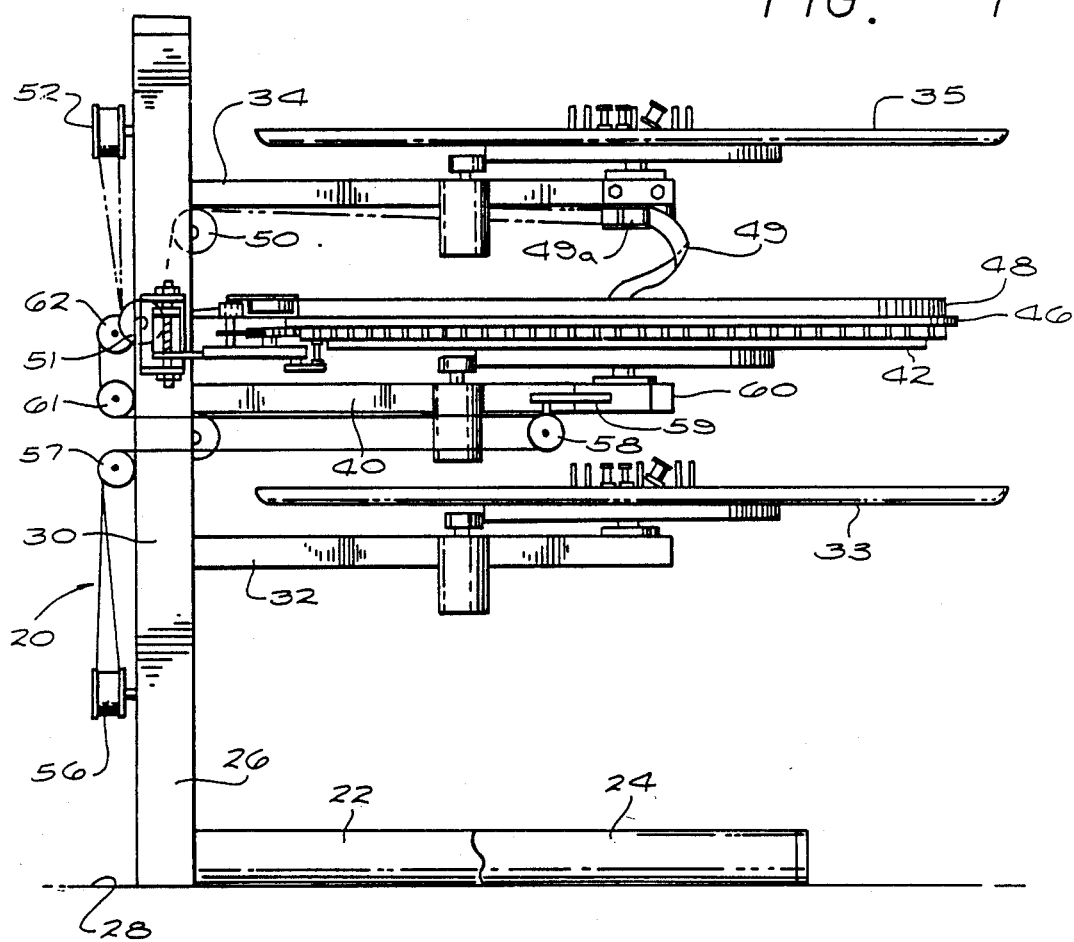
FIG. 1 is a side view of a film winding machine incorporating the presently preferred embodiment on the center of the three turntables.

In the drawings, FIG. 1 shows a film winding machine of generally conventional construction, modified to embody a system of the present invention. The machine includes a rigid support structure indicated generally at 20 including a pair of lower support legs 22, 24 forming a V with the vertex 26 at the left, resting on the floor 28. From the vertex 26 an upright post 30 extends upwardly. Support arms 32 and 34 are fixed to post 30 and project horizontally, each supporting a rotatable turntable 33 and 35, respectively, on which a coil of film is stored on edge.

A third support arm 40 extends horizontally between the other arms and carries a rotatable turntable 42. Attached to the upper side of turntable 42 is a platter indicated generally at 46 on which a quantity of film indicated generally at 48 is supported on its edge. The film path during operation includes an upwardly inclined exiting film portion 49 extending from the center of the platter through a take-off roller assembly 49a to a guide roller 50 mounted on the post 30.

Figures 2, 6:
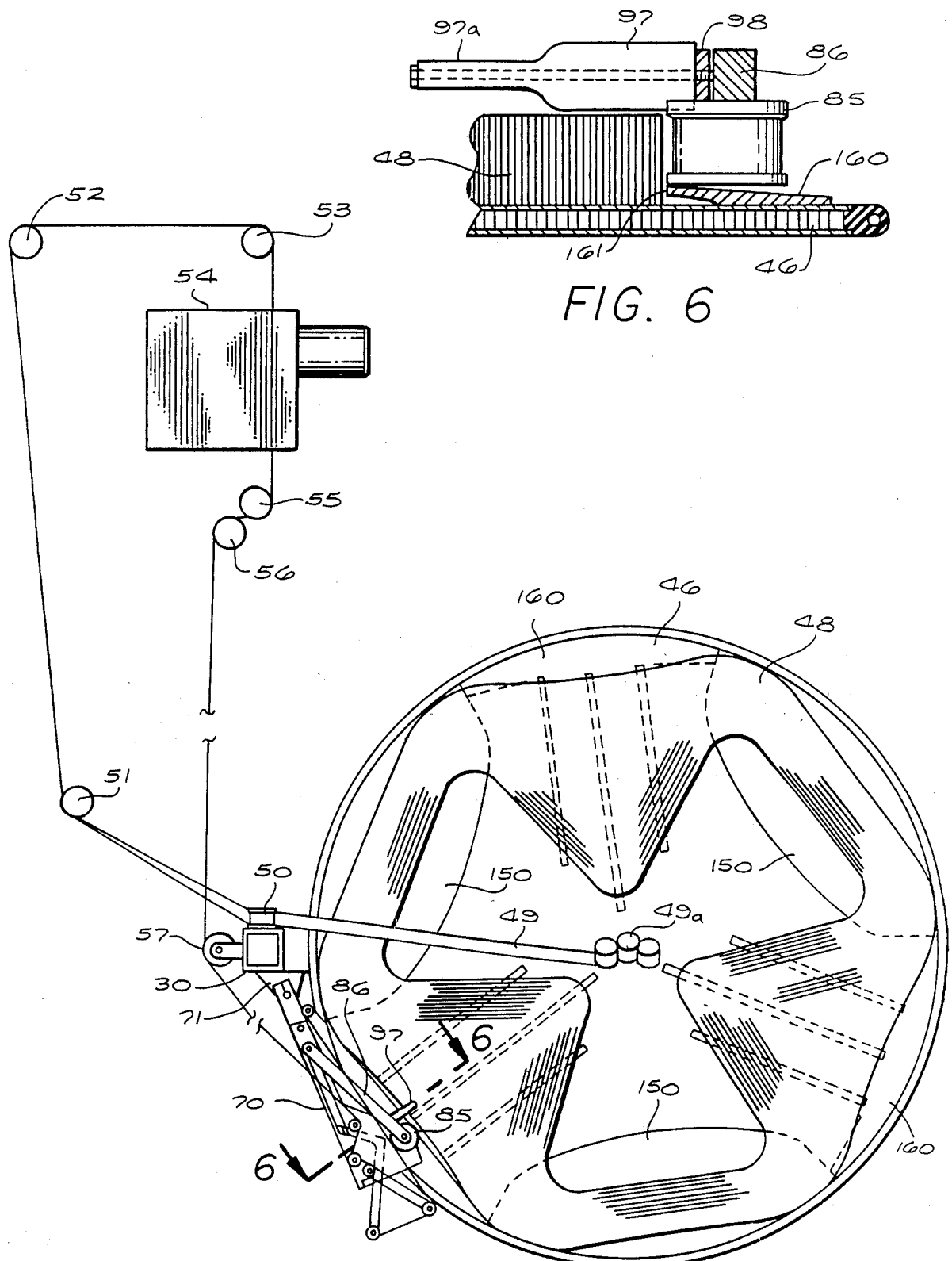
FIG. 2 is a top view of the center turntable of the apparatus of FIG. 1, with a motion picture film projector indicated diagrammatically.
FIG. 6 is an enlarged partial sectional view taken along the line 6—6 of FIG. 2.

FIG. 2 shows the exiting film portion 49 passing over guide roller 50, and as diagrammatically shown, over guide rollers 51, 52 and 53 to a film projector 54. The film return path from the projector passes over guide rollers 55, 56, 57 and 58, the latter roller being carried at the outer end of a speed control arm 59 of a speed control means 60 which controls the speed of rotation of the turntable. See FIG. 1. The control arm is biased in order to maintain a desired tension on the film entering and exiting the guide roller 58, and the speed control means may be one of those presently in use on endless loop film handling systems.

The film moves onto a film application arm 70 via guide rollers 61, 62, which arm 70 is pivotally mounted on the post 30 at a bracket 71. The configuration of the arm 70 will be described in greater detail in conjunction with FIG. 3.

Figure 4:
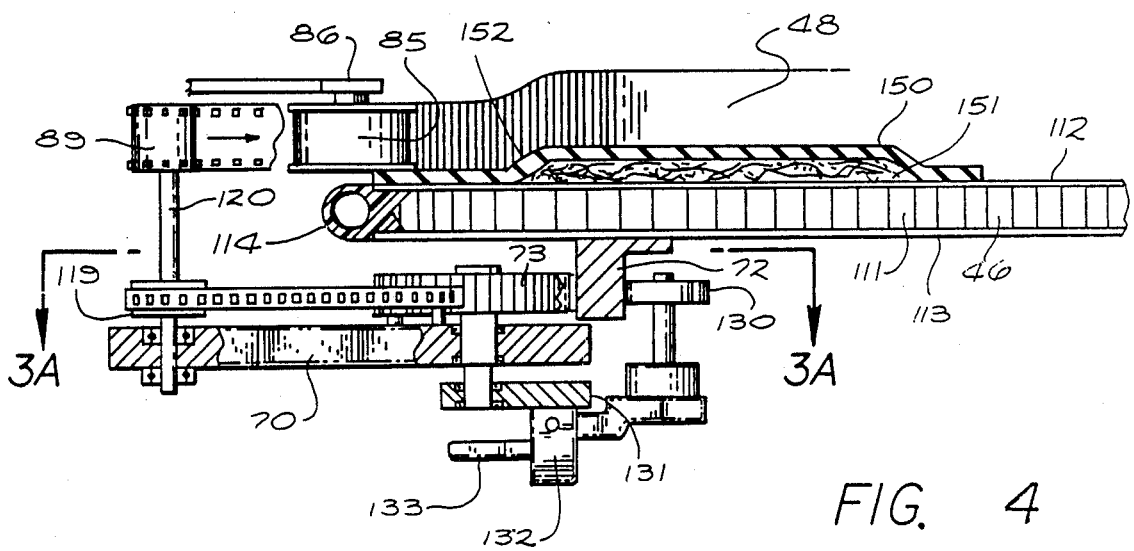
FIG. 4 is an enlarged sectional view taken along the line 6—6 of FIG. 2, with the platter rotated 60 degrees from the position of FIG. 2.
Figure 3:
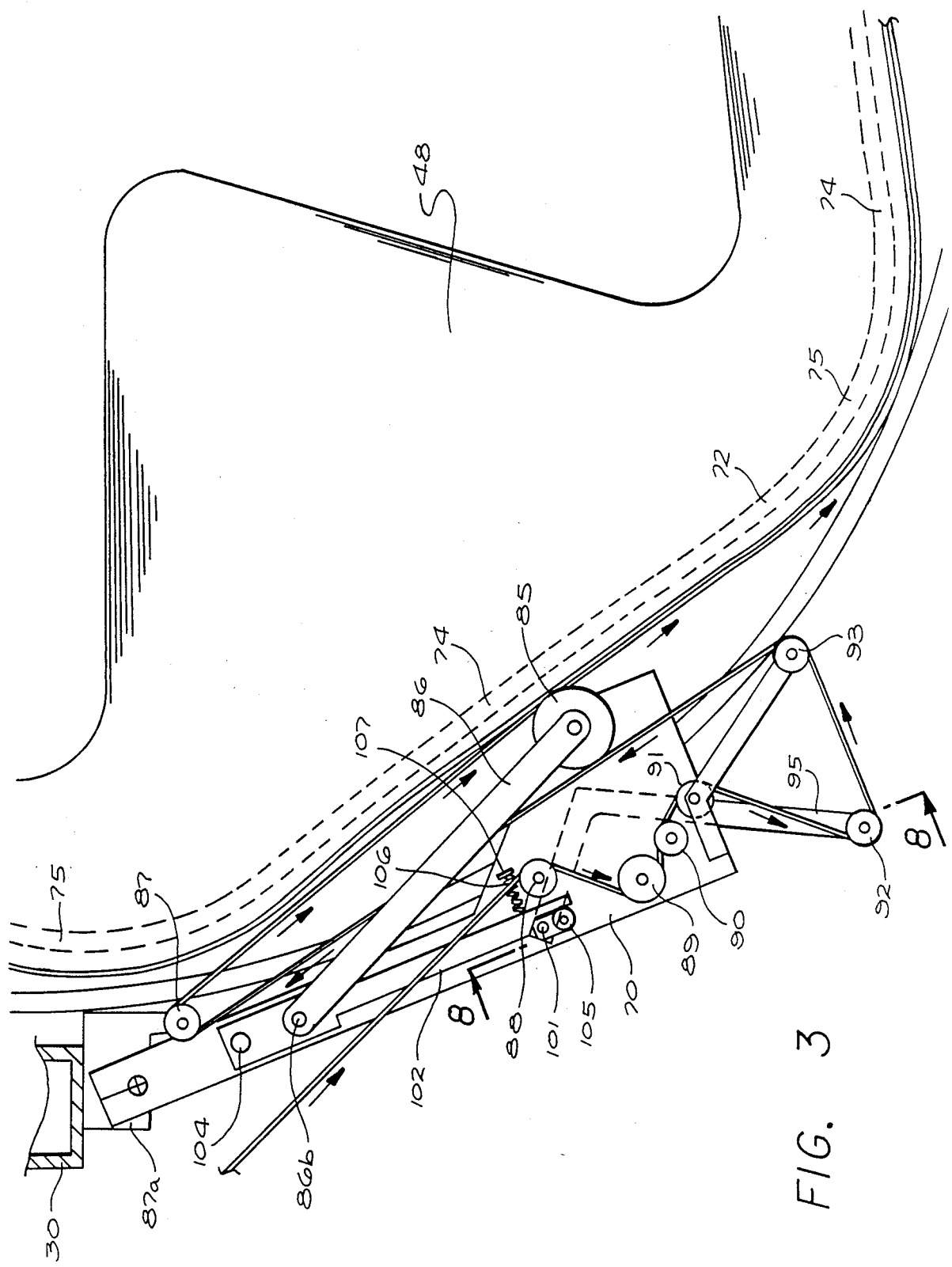
FIG. 3 is an enlarged view of the film application arm of the apparatus of FIG. 2.

A cam track 72 is carried on the underside of the platter 46, and preferably comprises a strip with gear teeth along the outer edge, for engagement by a cam 73 having mating teeth (FIG. 4). The cam track 72 is shaped in an even number of substantially straight sections 74 which are joined at curved corners 75, providing alternating even and odd cam track sections. In the embodiment illustrated, six cam track sections are utilized, as seen in FIGS. 2 and 3, where the cam track in FIG. 2 has the shape of the outer periphery of the coil 48. In operation, the incoming strip portion of the film is applied at the periphery of the coil in an even number of substantially straight strip sections joined at curved corners, and the cam track functions in conjunction with the film application arm and its components to achieve this desired shape. After the incoming strip is applied, alternating sections, such as the even sections, are formed into concave sections by a pusher roller, with the odd sections being left straight. One significant advantage of this arrangement is that the straight sections are maintained under a slight amount of tension between the curved corners so that the strip resists the tendency to curl, while the now concave sections also resist the tendency to curl because of the concave configuration.

Figure 9:
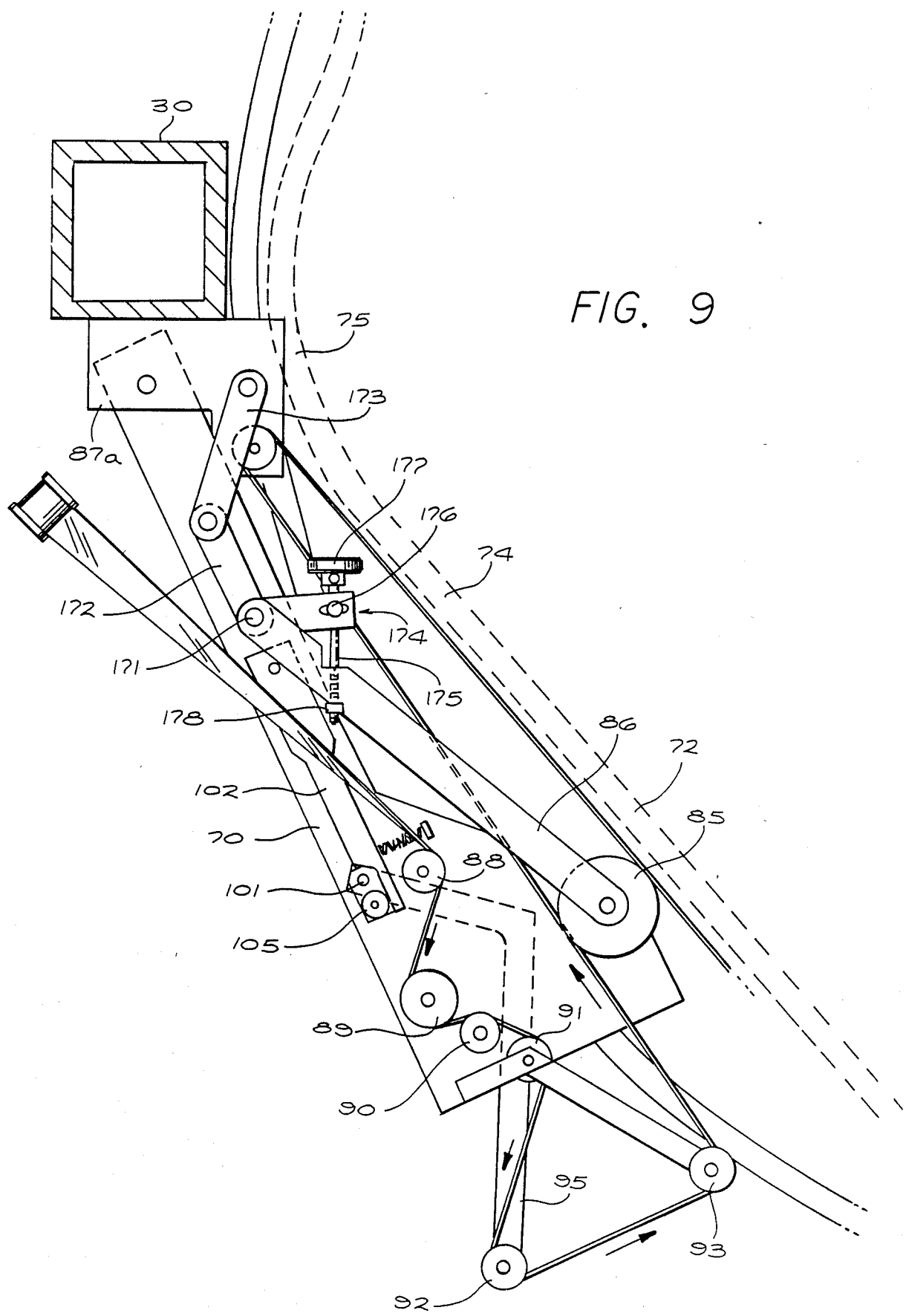
FIG. 9 is a view similar to that of FIG. 3 showing an alternative embodiment incorporating the four bar mechanism.
Figure 10:
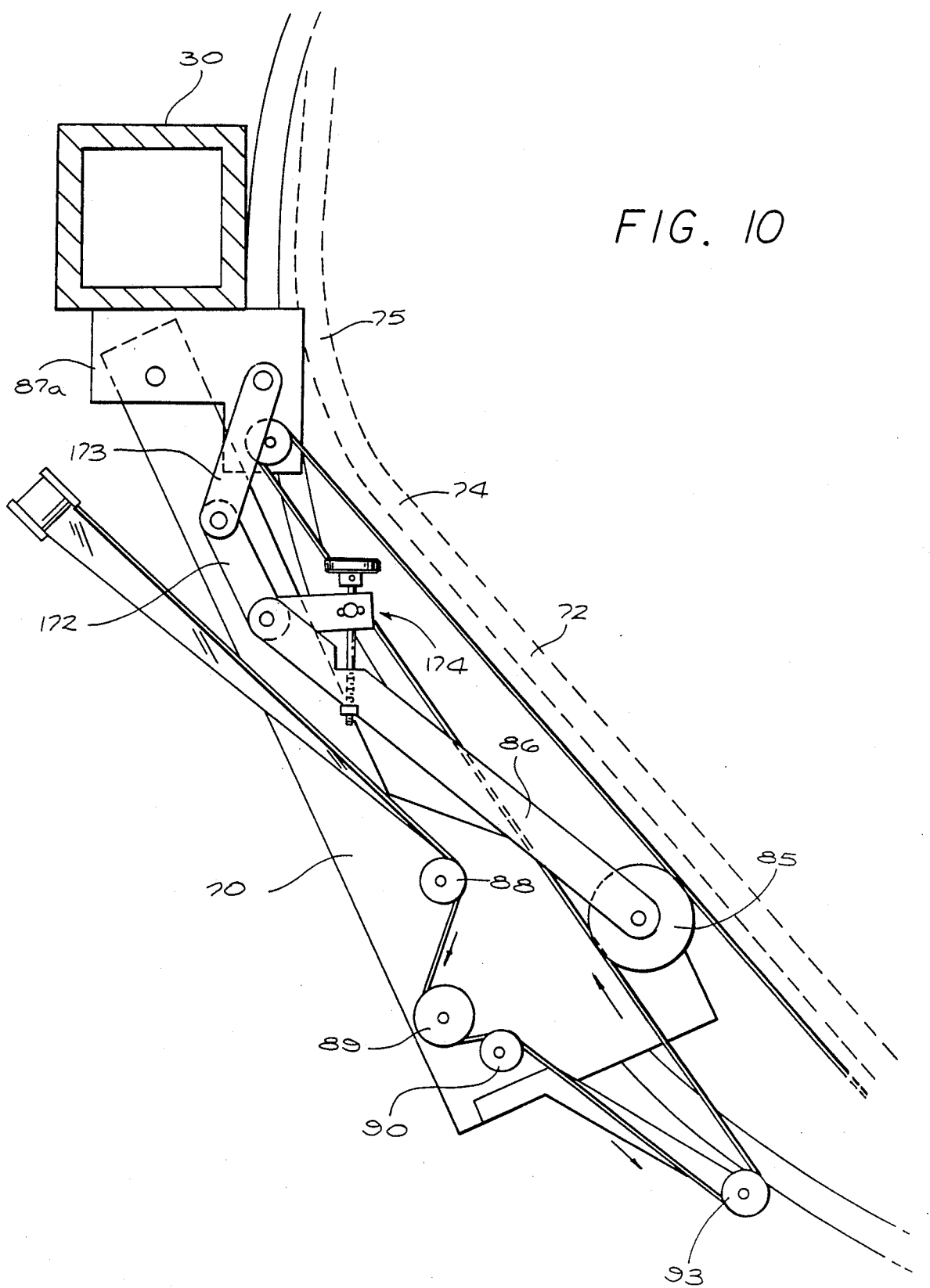
FIG. 10 is a view similar to that of FIG. 3 showing an alternative embodiment omitting the servo.

While the cam track sections are referred to as being substantially straight, it should be understood that they do not have to be absolutely straight between the curved corners. The track sections can have alternating straight and concave configurations as shown in FIG. 3, can have alternating convex and straight sections as shown in FIG. 9, and can have all straight sections as shown in FIG. 10, while still obtaining the desired end result.

A pusher roller 85 is carried on an arm 86 which is pivotally mounted on the application arm 70, in a manner to be described. With this arrangement, the pusher roller can be in contact with the outer layer of film on the coil 48 during the entire revolution of the platter. A film application roller 87 is mounted on a plate 87a carried on the post 30, and positioned so that preferably the roller 87 does not contact the coiled film 48. The film coming from the projector passes over the roller 62, around a roller 88 and a sprocket 89, past a conventional failsafe roller 90, another roller 91 and a tensioning roller 92, and a roller 93 leading to the application roller 87. The tensioning roller 92 is carried on an arm 95 pivotally mounted on the arm 70, with a spring providing the desired film tension at the application roller.

In the preferred embodiment, a roller 97 is carried in the horizontal position on an arm 98 in turn attached to the arm 86. The operation of the roller 97 is best illustrated in FIG. 6, with the roller being positioned to overlay the film coil 48 and urge the successive layers of the coil downward into contact with the platter to provide a uniform coil. The inner end 97a of the roller 97 is of a lesser diameter to accommodate the rise produced by pad 151, as shown in FIG. 4.

An arrangement for monitoring the amount of film being taken up on the platter during each revolution is incorporated. The arm 95 serves as a tension arm and is pivotally mounted on the arm 70 at a pivot pin 101, with the roller 92 rotatably mounted at the outer end thereof. The pusher roller 85 is carried on the pusher arm 86 which is pivotally mounted on a lever 102 at a post 86b with an adjustment plate 86a which permits adjustment of the angle between the arms 86 and 102. See FIG. 7. The lever 102 is pivotally mounted on the arm 70 at a pivot pin 104, with the other end of the lever 102 engaging a roller 105 carried on an arm 101a on the pin 101. The lever 102 is urged against the roller 105 by a compression spring 106 positioned between the lever 102 and a mounting bracket 107 carried on the arm 70. See FIGS. 3 and 8. The spring 106 could in an alternative arrangement be positioned under the roller 88.

The tension arm 95 is shown in the film loose position in FIG. 3, and moves counter-clockwise toward a film tight position. The spring 106 urges the tension arm to the loose film position. When the tension arm rotates counter-clockwise, engagement of the roller 105 with the end of the lever 102 causes the lever to rotate counter-clockwise and move the pivot point of the pusher arm 86 at pin 103 inward toward the center of the film coil.

This arrangement provides a feedback type of operation for monitoring the amount of film being taken up on the platter as the platter rotates. It has been determined that the length of film per sprocket hole can vary from one film to another, can vary along a length of film, and can vary with variations in environmental conditions. Therefore it is desirable to provide an automatic control for the amount of film being wound onto the platter per revolution. In the present arrangement, this is carried out by determining the amount of slack in the film accumulated by the tension arm as the angular position of the tension arm changes. This is used for positioning the pusher roller 85 in a manner to change the circumference of the film being laid onto the platter. The pusher roller position adjusts automatically with the change in position of the tension arm so that the outer circumference of the coil of film on the platter will equal the length of film being metered onto the platter with each revolution of the platter.

Loose film or slack in the film between the sprocket 89 and the platter will permit the tension arm to rotate clockwise away from the platter under the action of the spring 96. The linkage between the tension arm and the pusher roller moves the pusher roller outward away from the center of the platter and effectively increases the radius of the position of film being laid down on the platter. Conversely, tightening of the film will rotate the tension arm counter-clockwise and thereby move the pusher roller inward toward the center of the platter with the result that the film is applied onto the platter at a shorter radius.

The platter 46 is made circular, and typically is formed of a honeycomb core 111 with upper and lower skins 112, 113 respectively, as best seen in FIG. 4. A compressable extrusion 114 is inserted in the outer edge between the upper and lower skins, to serve as an end cap and protective rim.

The gear belt cam 72 is cemented to the bottom of the platter 46, directly or with an intermediate support member, with the substantially straight sections joined at corners. The cam follower gear 73 journaled in the arm 70 engages the gear belt 72 and drives a sprocket drive belt 116. The belt 116 is maintained in engagement with the gear 73 by rollers 117, 118 and drives a sprocket 119 on shaft 120 which also carries the sprocket 89 which serves as the metering sprocket for film advance. Tension from the belt 116 is provided by the roller 117 mounted in a slot in an arm 121, and urged outward by a spring 122. See FIG. 3A.

If desired, a follower roller 130 may be carried on an arm 131 which swivels on the arm 70, with the follower roller 130 engaging the inner side of the gear belt 72 for maintaining the gear 73 and gear belt in engagement. Preferably the follower roller 130 is mounted on a release linkage 132 which is actuated by lever 133 to provide for disengagement of the drive gear and gear belt.

Figure 5:
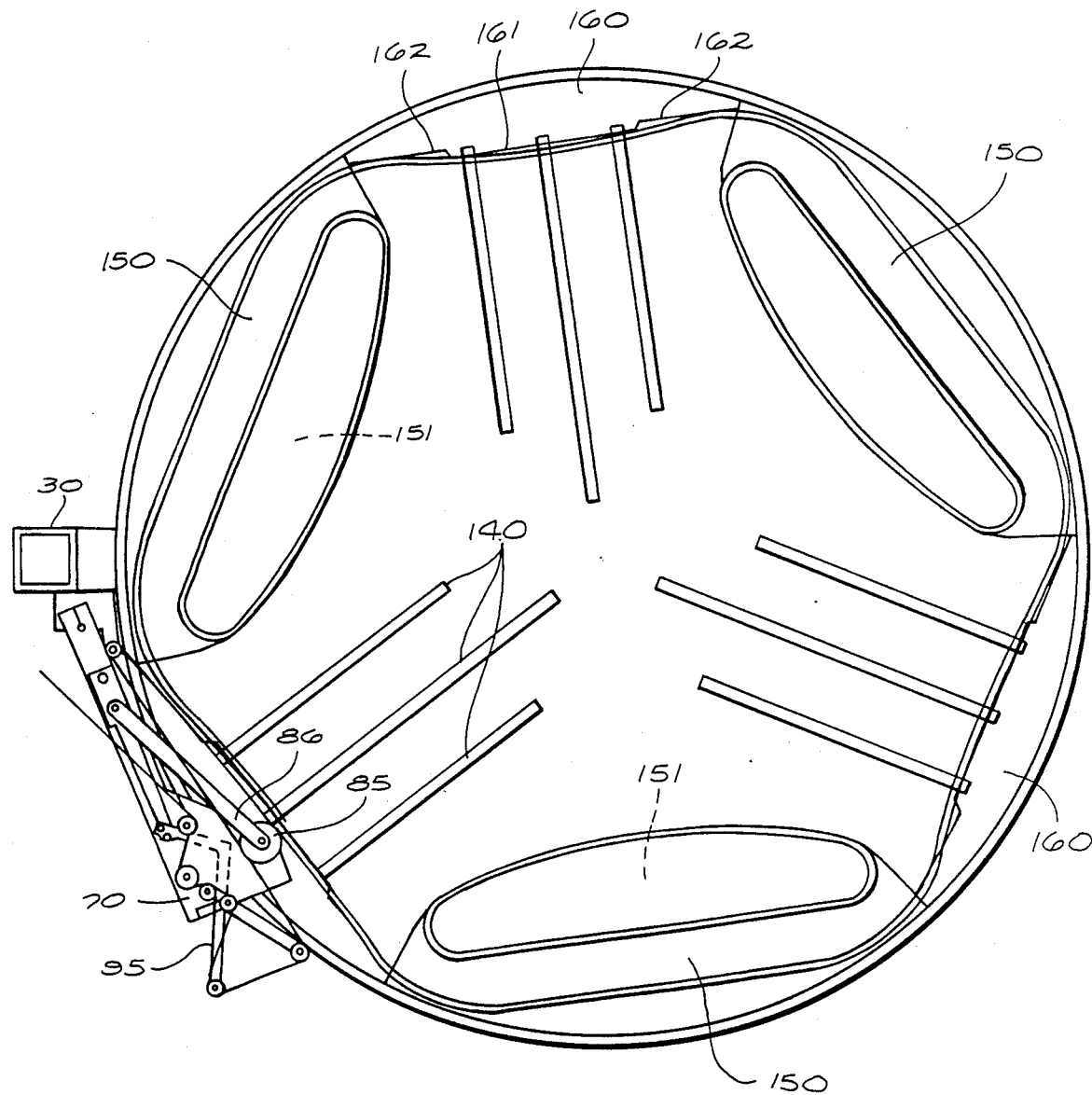
FIG. 5 is a view similar to that of FIG. 2, with the major portion of the coil omitted in order to show the platter surface.

As best seen in FIG. 5, one or more elongated skid strips 140 may be provided on the upper surface of the platter to assist the portions of film forming the cusps to move smoothly toward the center of the platter during operation. The skid strips may be made of teflon or similar material of low friction, which provides a skid surface for the lower edge of the film as each layer moves inwardly during operation.

Friction pads 150 are positioned on the platter to provide a continuous resistance surface at the odd sections for aid in coil shape formation. These continuous pads provide improved control of the film and positive loop formation with substantially all types of film and film conditions. The pads 150 could extend substantially to the center of the platter, but are not of as great importance at the inner portions of the platter. Hence the preferred configuration is to have the continuous pads 150 extend from the periphery inward for about ⅓ of the radius. These pads are made of a material having a relatively high coefficient of friction, such as rubber.

A filler pad 151 is positioned under a portion of each pad 150, with the outer periphery of the filler pad having a straight or substantially straight edge corresponding to the desired shape of the coil 48. Each filler pad provides a straight ramp or cliff 152 in the friction pad 150 which functions to maintain the film in the desired straight configuration as the inwardly moving film is moved upward over the transition, as seen in FIG. 4.

Skid ramps 160 are mounted on the platter 46 at the even sections to aid in the cusp formation. The ramps may be made of the same material as the strips 140. Each of the skid ramps 160 has an outer curve preferably corresponding to the periphery of the platter, and an inner edge of special design. Referring particularly to FIGS. 5 and 6, the inner edge 161 of the skid ramp 160 is raised, and has a convex shape, corresponding to the desired convex shape of the periphery of the coil at the even sections. Preferably, the ends 162 of the inner edge 161 are relieved so that there is no raised portion at each end. With this configuration, the film slides readily over the ends, while the raised center portion provides some resistance to inward film movement. Then as a strip of the film drops over the raised inner edge, the strip has the desired initial cusp or concave configuration.

In operation, the outer layer of film laid down by the application roller 87 is pushed radially inward by the pusher roller 85 at the even sections, while remaining straight at the odd sections. The film slides along the skid ramp 160 and after a number of layers of film have been applied, the initial layer moves over the inner edge of the skid ramp and drops down onto the platter and skid strips. The film at this point is formed into the desired cusp shape as defined by the inner edge of the skid ramp. The film in the odd section rests on the friction pads 150 and as the layers move inward, the film encounters the straight leading edge of the ramp 152 (FIG. 4), maintaining the desired straight section of the coil. While only a few film layers are shown in FIG. 5 for purposes of clarity, it should be understood that there actually will be a plurality of layers of film on the platter, as shown in FIGS. 2 and 3.

In operation, the arm 70 is moved toward and away from the center of the platter as the platter rotates, by engagement of the gear 73 with the gear belt 72. The pusher roller 85 is similarly moved in and out, and maintains substantially continuous contact with the outer layer of film, pushing the film inward in the even sections to the desired concave configuration.

In this preferred embodiment the cam track has alternating straight and concave sections, and the roller 85 follows the cam track to produce the same shape in the film coil.

The length of film applied per revolution of the platter should be the same as that removed from the center of the coil. With some film this can be accomplished by the sprocket metering as described above. However in many instances, sprocket metering is not sufficiently accurate. The feedback system using the tension arm 95 provides a more accurate arrangement for controlling the amount of film applied per platter revolution, and may be used with or without sprocket metering. At the present time the combination of sprocket metering and feedback control is preferred.

An alternative embodiment is shown in FIG. 9 using a mechanism for adjusting the movement of the pusher roller 85 with respect to the movement of the application arm 70. The arm 86 is pivotally mounted on a post 171 carried on the arm 70. A crank arm 172 is also pivotally mounted on the post 171, with one arm of the crank arm 172 connected to the plate 87a by a link 173, and with the other arm of the crank arm connected to the arm 86 by an adjustment mechanism 174. The adjustment mechanism 174 provides for adjusting the angular relation between the arm 86 and the crank arm 172, and typically comprises a shaft 175 riding in a collar 176 carried on the crank arm 172 and threaded into the arm 86. Rotation of the shaft 175 by the knob 177 moves the arm 86 with respect to the crank arm, and a nut 178 serves to lock the adjustment mechanism in the set position.

The arm 86 which carries the pusher roller 85 is actuated by a linkage comprising the arm 70, the plate 87a, the link 173, and the crank arm 172. With this linkage arrangement, as the arm 70 moves inward a particular amount, the linkage causes the arm 86 to move inward by a greater amount, thereby improving the formation of the cusp. The position of the roller 85 with respect to the arm 70 may be adjusted by means of the adjustment mechanism 174.

While the servo mechanism using the tension arm 95 is preferred, the apparatus may also be utilized without the servo mechanism while providing the desired application of the incoming strip portion to the periphery of the coil in the substantially straight strip section joined at curved corners, and such an embodiment is shown in FIG. 10.

I claim:

1. In an apparatus for continuously storing a strip of material in a coil, including a frame, a flat platter and drive means for rotating said platter on said frame, the coil lying edgewise on said platter and the strip including an incoming strip portion leading to the coil periphery and an outgoing strip portion leading from the coil center, the improvement comprising:
   a strip application roller carried on said frame and spaced from the coil for applying the incoming strip portion to the periphery of the coil of the strip on said platter as said platter rotates, in an even number of substantially straight strip sections joined at curved corners providing alternating even and odd straight strip sections;
   a pusher roller carried separate from and movable relative to said application roller; and
   pusher pressure means carried on said frame with said pusher roller mounted thereon for continuously applying an inward pressure by said pusher roller to said strip sections at the outer periphery thereof to form only said even strip sections into concave strip sections and to maintain only said odd strip sections substantially straight.

2. An apparatus as defined in claim 1 including resistance means positioned on said platter at said odd strip sections for engaging the strip edge and resisting movement of the strip toward the coil center.

3. An apparatus as defined in claim 2 wherein said resistance means has a friction producing surface with a lower level and a higher level with an inclined surface between said levels and with the outer edge of said higher level being substantially straight.

4. An apparatus as defined in claim 2 including skid means positioned on said platter at said even strip sections for engaging the strip edge and enhancing movement of the strip toward the coil center, said skid means having a convex inner edge with an upward turned lip.

5. An apparatus as defined in claim 1 including skid means positioned on said platter at said even strip sections for engaging the strip edge and enhancing movement of the strip toward the coil center, said skid means having an inner edge with a projecting convex central section between end sections, with said central section having an upward turned lip.

6. An apparatus as defined in claim 1 wherein the strip has sprocket holes along its length and said means for applying includes a sprocket for engaging said incoming strip portion sprocket holes, and
   including means for driving said sprocket as said platter rotates for applying the same number of strip sprocket holes to said coil for each revolution of said platter.

7. An apparatus as defined in any of claims 1-6 including a strip application controller comprising:
   a tension arm pivotally mounted for movement between strip loose and strip tight positions;
   a tension roller carried on said tension arm;
   spring means for urging said tension arm toward said strip loose position;
   strip guide means for guiding the incoming strip around said tension roller upstream of said strip application roller;
   said pusher pressure means including a pusher arm with said pusher roller carried thereon;
   a tension arm lever for engaging said tension arm for movement with said tension arm; and means for mounting said pusher arm on said tension arm lever.

8. In an apparatus for continuously storing a strip of material in a coil, the apparatus including a flat platter and drive means for rotating said platter, the coil lying edgewise on the platter and the strip including an incoming strip portion leading to the coil periphery and an outgoing strip portion leading from the coil center, the improvement comprising in combination:

a cam mounted for rotation with said platter about its center, said cam having a cam track with an even number of substantially straight track sections joined at curved corners providing alternating even and odd cam track sections; and means for applying the incoming strip portion to the periphery of the coil of the strip on said platter as said platter rotates in an even number of substantially straight strip sections providing alternating even and odd substantially straight strip sections connected by convex strip sections, said means for applying including a cam follower for engaging said cam track with said means for applying moving toward and away from said center as said platter rotates and varying the distance from said center to the point of application of the incoming strip portion, first roller means spaced from the coil for guiding the incoming strip onto said coil, and second roller means separate from said first roller means for engaging said coil at the outer periphery thereof at said even strip sections for urging only said even strip sections of said coil inward toward said center in a concave shape and at said strip sections for urging only said odd strip sections of said coil inward toward said center in a substantially straight shape.

9. An apparatus as defined in claim 8 wherein said cam follower includes a first gear and said cam track includes a second gear, with said first and second gear engaging each other for driving said first gear as a function of rotation of said cam and platter.

10. An apparatus as defined in claim 8 wherein said second roller means is positioned on said means for applying for continuously engaging said coil as it rotates.

11. An apparatus as defined in claim 10 wherein the periphery of said second roller means is at a lesser distance from said center than the periphery of said first roller means for spacing said first roller means from said coil.

12. An apparatus as defined in claim 8 wherein said means for applying includes a support arm pivoted for movement in a horizontal plane, and a pusher arm with said second roller means carried thereon, with said pusher arm pivoting on said support arm.

13. An apparatus as defined in claim 8 wherein said means for applying includes a support arm pivoted for movement in a horizontal plane, with said second roller means mounted thereon.

14. An apparatus as defined in claim 8 wherein said even cam track sections are slightly concave and said odd cam track sections are straight.

15. An apparatus as defined in claim 8 wherein said even cam track sections are straight and said odd cam track sections are slightly convex.

16. An apparatus as defined in claim 8 wherein both said even and odd cam track sections are straight.

17. An apparatus as defined in claim 8 wherein the strip has sprocket holes along its length and said means for applying includes a sprocket for engaging said incoming strip portion sprocket holes, and including means for driving said sprocket as said platter rotates for applying the same number of strip sprocket holes to said coil for each revolution of said platter.

18. An apparatus as defined in claim 8 including resistance means positioned on said platter at said odd strip sections for engaging the strip edge and resisting movement of the strip toward the coil center.

19. An apparatus as defined in claim 18 wherein said resistance means has a friction producing surface with a lower level and a higher level with an inclined surface between said levels and with the outer edge of said higher level being substantially straight.

20. An apparatus as defined in claim 18 including skid means positioned on said platter at said even strip sections for engaging the strip edge and enhancing movement of the strip toward the coil center, said skid means having a convex inner edge with an upward turned lip.

21. An apparatus as defined in claim 8 including skid means positioned on said platter at said even strip sections for engaging the strip edge and enhancing movement of the strip toward the coil center, said skid means having an inner edge with a projecting convex central section between end sections, with said central section having an upward turned lip.

22. In an apparatus for continuously storing a strip of material in a coil, the apparatus including a flat platter and drive means for rotating said platter, the coil lying edgewise on the platter and the strip including an incoming strip portion leading to the coil periphery and an outgoing strip portion leading from the coil center, the improvement comprising in combination:

a cam mounted for rotation with said platter about its center, said cam having a cam track with an even number of substantially straight track sections joined at curved corners providing alternating even and old cam track sections; and means for applying the incoming strip portion to the periphery of the coil of the strip on said platter as said platter rotates in an even number of substantially straight strip section providing alternating even and odd substantially straight strip sections connected by convex strip sections, said means for applying including a cam follower for engaging said cam track with said means for applying moving toward and away from said center as said platter rotates and varying the distance from said center to the point of application of the incoming strip portion, first roller means for guiding the incoming strip onto said coil, and second roller means for engaging said coil at the outer periphery thereof at said even strip sections for urging only said even strip sections of said coil inward toward said center in a concave shape and at said odd strip sections for urging said coil inward toward said center in a substantially straight shape, said means for applying including:

a film drive sprocket;

a spring loaded tensioning roller;

an endless drive belt; and means for positioning said drive belt for engaging said cam follower and said sprocket, with the strip of material moving around said sprocket past said tensioning roller and said first roller means onto said coil.

23. In an apparatus for continuously storing a strip of material in a coil, the apparatus including a flat platter and drive means for rotating said platter, the coil lying edgewise on the platter and the strip including an incoming strip portion leading to the coil periphery and an outgoing strip portion leading from the coil center, the improvement comprising in combination:
 a cam mounted for rotation with said platter about its center, said cam having a cam track with an even number of substantially straight track sections joined at curved corners providing alternating even and odd cam track sections; and
 means for applying the incoming strip portion to the periphery of the coil of the strip on said platter as said platter rotates in an even number of substantially straight strip sections providing alternating even and odd substantially straight strip sections connected by convex strip sections, said means for applying including
 a cam follower for engaging said cam track with said means for applying moving toward and away from said center as said platter rotates and varying the distance from said center to the point of application of the incoming strip portion,
 first roller means for guiding the incoming strip onto said coil, and
 second roller means for engaging said coil at the outer periphery thereof at said even strip sections for urging only said even strip sections of said coil inward toward said center in a concave shape and at said strip sections for urging said coil inward toward said center in a substantially straight shape;
 said means for applying including a four link movement comprising:
 a first arm as the first link, with said cam follower mounted thereon;
 a second arm as the second link and pivotally mounted on said first arm at an intermediate pint of said second arm, with said second roller means mounted thereon;
 a bracket as the third link, with said first arm pivotally mounted thereon and with said first roller means mounted thereon; and
 a link member as the fourth link and connected between said bracket and said second arm.

24. An apparatus as defined in claim 23 wherein said second arm comprises a crank arm with two ends joined at said intermediate point, and including means for adjusting the angle between said two arms.

25. In an apparatus for continuously storing a strip of material in a coil, the apparatus including a flat platter and drive means for rotating said platter, the coil lying edgewise on the platter and the strip including an incoming strip portion leading to the coil periphery and an outgoing strip portion leading from the coil center, the improvement comprising in combination:
 a cam mounted for rotation with said platter about its center, said cam having a cam track with an even number of substantially straight track sections joined at curved corners providing alternating even and odd cam track sections; and
 means for applying the incoming strip portion to the periphery of the coil of the strip on said platter as said platter rotates in an even number of substantially straight strip sections providing alternating even and odd substantially straight strip sections connected by convex strip sections, said means for applying including
 a cam follower for engaging said cam track with said means for applying moving toward and away from said center as said platter rotates and varying the distance from said center to the point of application of the incoming strip portion,
 first roller means for guiding the incoming strip onto said coil, and
 second roller means for engaging said coil at the outer periphery thereof at said even strip sections for urging only said even strip sections of said coil inward toward said center in a concave shape and at said odd strip sections for urging said coil inward toward said center in a substantially straight shape;
 said means for applying includes a strip application controller comprising:
 a tension arm pivotally mounted on said means for applying for movement between strip loose and strip tight positions;
 a tension roller carried on said tension arm;
 spring means carried on said means for applying for urging said tension arm toward said strip loose position;
 strip guide means for guiding the incoming strip around said tension roller upstream of said first roller means;
 a pusher arm with said second roller means carried thereon;
 a tension arm lever mounted on said means for applying and engaging said tension arm for movement with said tension arm; and
 means for mounting said pusher arm on said tension arm lever.

26. In a method for continuously storing a strip of material in a coil so that the stored coil will have alternating straight and concave segments, with the coil on a flat platter having drive means for rotating the platter, with the coil lying edgewise on the platter and the strip having an incoming strip portion leading to the coil periphery and an outgoing strip portion leading from the coil center, the improvement comprising:
 applying the incoming strip portion to the periphery of the coil of the strip on the platter as the platter rotates, in an even number substantially straight strip sections joined at curved corners providing alternating even and odd substantially straight strip sections and applying an inward pressure to the even strip sections along a first path to form only the even strip sections into the concave strip segments and applying an inward pressure to the odd strip sections along a second different path to maintain only the odd strip sections in the substantially straight strip segments.

27. The method as defined in claim 26 including the step of applying a drag force to the odd strip sections at a strip edge for resisting movement of the strip toward the center of the coil.

28. The method as defined in claim 27 including the step of applying a restraining force to the even strip sections at a strip edge in a concave curve as the strip moves inward toward the center of the coil, and releasing the force at substantially the same time along the curved edge.

29. The method as defined in claim 26 including the step of applying a restraining force to the even strip sections at a strip edge in a concave curve as the strip moves inward toward the center of the coil, and releasing the force at substantially the same time along the curved edge.

30. The method as defined in any of claims 26-29 wherein the strip has sprocket holes along its length, and including the step of driving the strip with a sprocket as the platter rotates to apply the same number of strip sprocket holes to the coil for each revolution of the platter.

31. The method as defined in any of claims 26-29 including the steps of:

removing the outgoing strip portion from the center of the coil;

applying to the periphery of the coil per revolution of the platter, an incoming strip portion of the same length as that removed from the center of the coil;

continuously contacting the coil with a pusher roller as the coil rotates; and automatically adjusting the pusher roller position so that the outer circumference of the coil on the platter will substantially equal the length of strip being removed from the platter with each revolution of the platter.

32. In an apparatus for continuously storing a strip of material in a coil, including a frame, a flat platter and drive means for rotating said platter on said frame, the coil lying edgewise on said platter and the strip including an incoming strip portion leading to the coil periphery and an outgoing strip portion leading from the coil center, the improvement comprising:

a strip application roller carried on said frame for applying the incoming strip portion to the periphery of the coil of the strip on said platter as said platter rotates, in an even number of substantially straight strip sections joined at curved corners providing alternating even and off straight strip sections;

a pusher roller carried on said frame;

pusher pressure means carried on same frame for continuously applying an inward pressure by said pusher roller to said strip sections at the outer periphery thereof to form only said even strip sections into concave strip sections and to maintain said off strip sections substantially straight; and a strip application controller comprising;

a tension arm pivotally mounted for movement between strip loose and strip tight positions;

a tension roller carried on said tension arm;

spring means for urging said tension arm toward said strip loose position;

strip guide means for guiding the incoming strip around said tension roller upstream of said strip application roller;

said pusher pressure means including a pusher arm with said pusher roller carried thereon;

a tension arm lever for engaging said tension arm for movement with said tension arm; and means for mounting said pusher arm on said tension arm lever.

* * * * *